Figure 1:
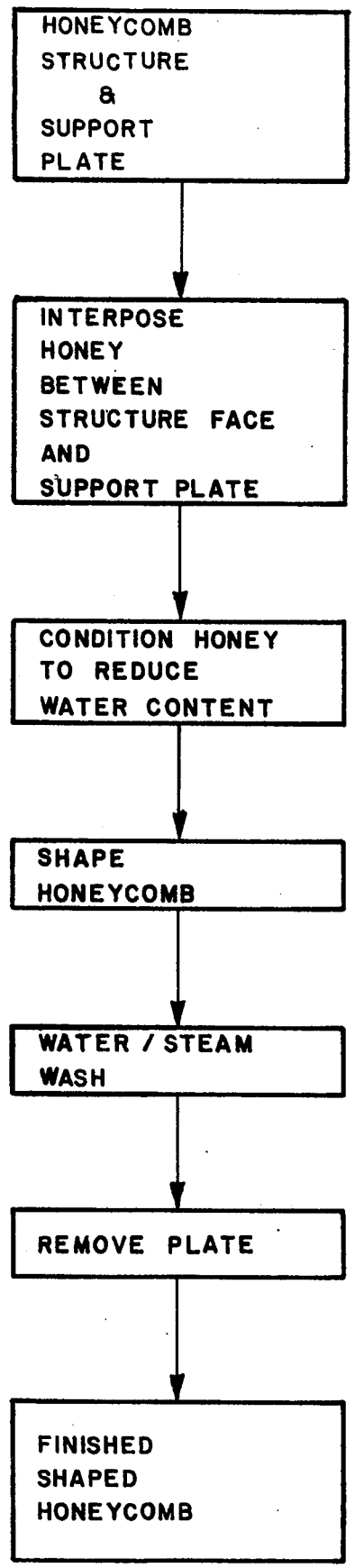

United States Patent [19]

Canellos

[11] Patent Number: 4,478,662

[45] Date of Patent: Oct. 23, 1984

[54] HONEYCOMB STRUCTURE CHUCKING

[76] Inventor: Demitrious Canellos, 89 Universe Dr., Levittown, N.Y. 11756

[21] Appl. No.: 442,477

[22] Filed: Nov. 17, 1982

Related U.S. Application Data

[63] Continuation of Ser. No. 256,587, Apr. 22, 1981, abandoned.

[51] Int. Cl.³ .................................................. B32B 31/00
[52] U.S. Cl. ........................................ 156/155; 29/423; 29/424; 156/154; 156/247; 156/267; 156/268; 156/285; 156/326; 156/336; 156/344; 428/116
[58] Field of Search ............... 156/154, 285, 155, 326, 156/247, 336, 267, 344, 268; 29/423, 527.2, 424, 559; 51/322, 281 R; 106/162; 428/116; 127/30

[56] References Cited

U.S. PATENT DOCUMENTS

| | | | |
|---|---|---|---|
| 2,021,450 | 11/1935 | Hampton | 127/30 |
| 2,856,292 | 10/1958 | Kaloyereas | 127/30 |
| 3,064,345 | 11/1962 | Herman et al. | 29/423 |
| 3,084,426 | 4/1963 | Hugo et al. | 29/424 |
| 3,176,387 | 4/1965 | Argues et al. | 29/423 |
| 3,586,559 | 6/1971 | Shepard | 156/247 |

FOREIGN PATENT DOCUMENTS 1014895 12/1965 United Kingdom ................ 156/285

Primary Examiner—John J. Gallagher

[57] ABSTRACT

A process affixes a honeycomb structure to a plate in a manner whereby the structure and the plate may be chucked and the exposed surface of the honeycomb may be machined. The steps of the process include applying to the surface of the plate a viscous coating of honey; embedding one surface of the honeycomb in the viscous honey coating to leave the opposite honeycomb surface exposed for machining, and curing the coating to more tightly secure the honeycomb to the surface.

15 Claims, 2 Drawing Figures

HONEYCOMB STRUCTURE CHUCKING

This is a continuation, of application Ser. No. 256,587 filed Apr. 22, 1981, now abondoned.

TECHNICAL FIELD

This invention relates to the releasable holding of honeycomb structures such as wing component cores for shaping, e.g. by machining or other manufacturing operations. In the art, such holding for manufacturing processing is referred to as "chucking". The invention more particularly refers to improvements in the chucking of honeycomb structures for their surfaces to be cut, machined or routed. The use of novel water removable chucking materials characterizes the invention.

Honeycomb structures are used as cores for aircraft wing components and construction panels. Typically, the honeycomb is sandwiched between and glued or affixed to planar sheet material skins and forms the core of the panel. The honeycomb typically is formed from foil-thin sheets of suitably treated paper, plastic, aluminum, titanium, steel or similar material glued, or otherwise partially affixed together in a pre-arranged pattern and subsequently expanded by separating the honeycomb foil except at lines of affixing, into the characteristic pattern of Nature's "honeycomb". The resulting honeycomb structure is both a spacer and stiffener for the skin sheets. The honeycomb structure pattern is a two dimensional sequence of hexagon, square, or any of numerous other cross sectional shapes depending upon the initial pattern in which the sheets making up the core are glued or affixed. In any event, the sheets, which define the panel skins are glued or affixed to the side edges of the foils which are incorporated in the honeycomb structure. The resultant honeycomb sandwich has its face skin sheets as the prime load bearing members and will withstand large compressive forces without buckling. High strength-to-weight ratios are regularly realized with relatively thin skins and only light gauge honeycomb structure stock.

Aircraft components are one area in which light weight honeycomb sandwiches have been employed to reduce weight and increase strength-to-weight ratios. Such honeycomb sandwiches have been employed as the aircraft fuselage skin and in the skin or covering of wings, rudders and stabilizers. Such honeycomb sandwiches have been found to be particularly useful in the leading edges of wings where high compressive load strength is of particular importance.

In some uses, such as, for example, for the leading edge of a wing, for purposes of attaching the honeycomb sandwich to the adjoining structure, it is often desirable that the structure skins at the edge to be attached to adjoining structure be thicker than the skins in areas of the honeycomb sandwich remote to adjoining structure. Where the honeycomb sandwich component is to be cantilevered, the thickness of the skin can progressively decrease in thickness in steps from the point of attachment outwardly toward the end of the sandwich. In order that the honeycomb sandwich be uniform in thickness and, at the same time, the compressive forces applied to the skin be applied to the honeycomb longitudinally of the honeycomb walls, it is accepted practice to machine, mill or rout out one or both surfaces of the honeycomb to accommodate skins of changing thickness. Thus, uniformity in overall thickness of the honeycomb sandwich is maintained despite changes in thickness of the skin employed.

Because honeycomb structures are conventionally formed from foil-thin sheet stock, difficulty is experienced in holding honeycomb structures simply by mechanically clamping the honeycomb, for machining, milling or routing, e.g. to accommodate a plate or skin of changing thickness.

Various expedients have been developed over the years to overcome this problem. It is known for example to immerse one edge surface of the honeycomb in water, freeze the water to hold the honeycomb stationary during machining operations, and then release the honeycomb by simply melting the ice. Also known, is the use of water-soluble waxes, e.g. polyethylene glycol waxes which are solids at room temperature, by immersing the edge surface of the honeycomb structure opposite the surface to be machined in a powder of the wax, heating the wax to a liquid state, permitting resolidification around the edge, machining as necessary, then washing the wax off in one or more baths. The problem with the first expedient is lack of holding power, cost of refrigeration equipment, and unreliability in use, particularly where time periods for processing were indeterminate. A practical problem too, was the tendency of the heat of machining to melt the ice; that is the very operation being performed was inimical to maintaining the chucking properties of the ice.

Because the wax chucking system is presently widely employed, its techniques and problems will be examined in some detail. It has been common practice in chucking honeycomb structures for machining or routing of the surface to affix or attach the honeycomb to a rigid plate at one honeycomb surface while the other surface is machined or routed. Such chucking has been accomplished by positioning the honeycomb on a flat, rigid plate, such as a metal plate with the surface to be machined or routed facing upward and the opposite surface facing downward and in contact with the rigid plate. A mask or dam is then applied to the plate around the honeycomb structure. A granular, polyglycol wax is then sprinkled into and around the honeycomb to form a substantially uniform deposit of wax on the plate around the structure and in its interstices. Sufficient granular wax is deposited so that when subsequently melted, the wax will form a coating of uniform thickness on the plate and around the honeycomb and its wall ends in a thickness between ⅛ inch and ⅜ inch thick, depending upon the type and severity of the machining or routing to be performed on the opposite surface. The plate, wax and honeycomb are then heated, to melt and flow the wax around the core and in the honeycomb interstices and then all are cooled to harden the wax. Depending upon the thickness of the honeycomb, which can be as thin as ⅜ inch or as thick as 6 inches or more, the machining or routing must be carried out at a sufficiently slow speed so as not to melt the wax.

Once machining or routing with hot melt wax chucking has been completed, the wax must be remelted and removed from the honeycomb and from the plate. This must be accomplished without damage to the honeycomb or plate and so that all wax which could interfere with the subsequent bonding of the honeycomb to a plate or skin is removed. Such wax removal is conventionally carried out with water heated to 180° F. with the honeycomb typically being rinsed three times, in separate tanks. The dwell time in the tanks must, of course, be sufficient to heat the honeycomb and wax to the temperature at which such wax or wax residue can be removed and to remove the wax and residue. Such three tank working and rinsing in a typical chucking may take fifty or more minutes. Apart from the difficulties of applying and removing the wax and the care which must be exercised in machining or routing of the honeycomb to avoid melting of the wax and loosening of the honeycomb, the disposal of the wax and rinse water after chucking is an environmental problem. The wax in the water tends to contaminate and adversely affect sewer, disposal and septic systems. The wax contaminates ground water and is difficult and expensive to remove from the rinse water before the water is fed to a disposal or septic system or to the ground, stream, river or the like. The wash product is an organically contaminated aqueous system which can not be discharged into municipal sewage lines, but must be trucked to a dump site, if one willing to accept the material can be found. Moreover, the wax system is costly in needed materials, cumbersome to use, involving as it does the critical distribution of sufficient powder onto and around the knife-edge ends of the honeycomb foil sheets.

The present invention eliminates the problems just described in a remarkably simple and effective way. It is anticipated that the chucking system herein disclosed will be widely adopted and replace all other commonly used systems for chucking honeycomb structures.

DESCRIPTION OF THE INVENTION

It is therefore an object of the invention to provide an improved method and apparatus for chucking honeycomb structures for machining operations. It is another object to provide novel means for chucking honeycomb structures which is environmentally innocuous, low cost, easy to use, free of critical stages, readily available, not subject to sudden price fluctuations, more effective than previous means including wax and ice, readily tailored to particular chucking situations, and in general a remarkable step forward in the art of honeycomb chucking.

Simply put, it has been discovered that water based solutions consisting essentially of glucose and fructose in weight ratios of 0.2:1 to 1:0.2 are a vast improvement over wax in chucking honeycomb structures. Such solutions can be compounded, but are widely available as natural honey.

In demonstrating the effectiveness of honey in chucking honeycomb, it has been shown that honey flows easily and freely over the plate and the immersed ends of the honeycomb; it water washes readily; no contamination of the water table results, since the product is per se biodegradable. These processing advantages are, however, not even the most important feature, since it has been found that contrary to the ice and water expedients discussed above heat of operation increases the performance of honey as a chucking material, and does not diminish it within the expected range of temperatures. This means that using honey for chucking enables increased speeds, and higher production rates, less scrap in operations involving the machining, milling, routing or other shaping, forming, or honeycomb handling operation.

The foregoing objects of the invention are realized in accordance with the invention process and apparatus. In general, in its process aspects, the present invention is a process for affixing a honeycomb structure, or core, to a plate so that such structure (or core) and plate might be chucked and the exposed surface of said honeycomb might be machined, and comprises the steps of applying to the surface of the plate a viscous coating of honey and embedding one surface of said honeycomb in said viscous honey coating so as to leave the opposite honeycomb surface exposed for machining.

In particular embodiments, the one surface of the honeycomb to be embedded in the honey coating on the plate is coated with honey before the edge is embedded in the honey coating on the plate; the honey has a viscosity of 260+ or −30 poise measured on a Brookfield Viscometer at 76°–78° F.; a further step is provided of applying pressure to the honeycomb on the plate and, while applying the pressure, heating the honeycomb, the plate and the honey to cure the honey, e.g. the honeycomb, the plate and the honey are heated to a temperature of about 250° F. or until the honey is tacky to the touch; the further steps are provided of heating the honeycomb, the plate and the honey coating with an aqueous medium after the exposed honeycomb surface has been machined, to solubilize and soften the honey and assist in removing the honeycomb from the plate; the honey is clover honey; and the further step is provided wherein the honey is heated to a temperature of about 250° F. and is applied at such temperature just before the heated honey is tacky to the touch.

More particularly, the invention relates to a process of chucking honeycomb structure during manufacturing operations such as shaping, including securing the honeycomb structure to a support surface with honey in honeycomb structure chucking relation during manufacturing operations, and thereafter removing the honey.

Such process further includes: conditioning the honey in situ by removal of a portion of its water content to more tightly secure the honeycomb structure to the support structure; exposing the honey in honeycomb structure contact to less than atmospheric pressure for a time and at a temperature sufficient to effect the water portion removal by evaporation from the honey; exposing the honey in honeycomb structure contact to an elevated temperature for a time and at an atmospheric pressure sufficient to effect the water portion removal by evaporation from the honey; exposing the honey in honeycomb structure contact to an elevated temperature and less than atmospheric pressure for a time sufficient to effect the water portion removal by evaporation from the honey; effecting the conditioning in a controlled environment, and maintaining the temperature within the environment above about 250° F.; reducing the atmospheric pressure within the controlled environment below about 0.8 atmosphere; and where the honey initially has a water content between about 8% and 25%, reducing the water content by removal of a portion thereof equal to not less than one-fourth of the initial water content, and freely of substantial crystallization of the honey; using as the honey a honey having a fructose to glucose ratio by weight between about 0.2:1 and 1:0.2; using as the honey a honey having a composition consisting essentially by weight of:

| | |
|---|---|
| Water | 8 to 25% |
| Glucose | 30 to 42% |
| Fructose | 23 to 39% |
| Sucrose | 0 to 4%; | and preferably using as the honey, natural honey.

The invention further provides apparatus, in the form of apparatus for chucking honeycomb structure during manufacturing operations such as shaping, the structure having at least one reticulate face, comprising a mass of honey clinging to the honeycomb structure at its reticulate face and in chucking relation, and a support plate secured to the honeycomb structure by the honey.

In particular embodiments of the apparatus, the edge margin of the honeycomb structure reticulate face is immersed in the mass of honey; there is provided means urging the honeycomb structure face into honey immersion; the honey is artifically reduced in water content in chucking improvement generating relation; the honey has a Brookfield viscosity above about 260 poise at room temperature; there is further provided means to artificially increase the viscosity of the honey by water content reduction; there is further provided means to remove the honey from the honeycomb structure after the manufacturing operations, typically comprising a water or steam supply to the honeycomb structure; there is further provided means urging the honeycomb face into honey immersion; the means for conditioning the honey in situ by removal of a portion of its water content to more tightly secure the honeycomb structure to the plate comprises means exposing the honey in honeycomb structure contact to less than atmospheric pressure for a time and at a temperature sufficient to effect the water portion removal by evaporation from the honey, including typically elevated temperature means sufficient to effect the water portion removal by evaporation from the honey, e.g. the conditioning means is adapted to effect the conditioning in a controlled environment and maintain a temperature within the environment above about 250° F.; the conditioning means is adapted to reduce the atmospheric pressure within the controlled environment below about 0.5 atmosphere; the honey initially has a water content between about 8% and 25%, and the conditioning means is adapted to reduce the water content by removal of a portion thereof equal to not less than one-fourth of the initial water content, and freely of substantial crystallization of the honey; the honey is a honey having a fructose to glucose ratio by weight between about 0.2:1 and 1:0.2; the honey is a honey having a composition consisting essentially by weight of:

| Water | 8 to 25% |
| Glucose | 30 to 42% |
| Fructose | 23 to 39% |
| Sucrose | 0 to 4%; | and the honey preferably is a natural honey.

The invention further provides a method of shaping honeycomb structure which includes retaining the structure relatively immobile for shaping by milling, routing and like operations by immersion of the edge margin of a reticulate face thereof in honey of sufficient viscosity to immobilize the structure relative to a support structure during shaping operations, and a novel shaped honeycomb structure made by the method.

THE DRAWING

Figure 2:
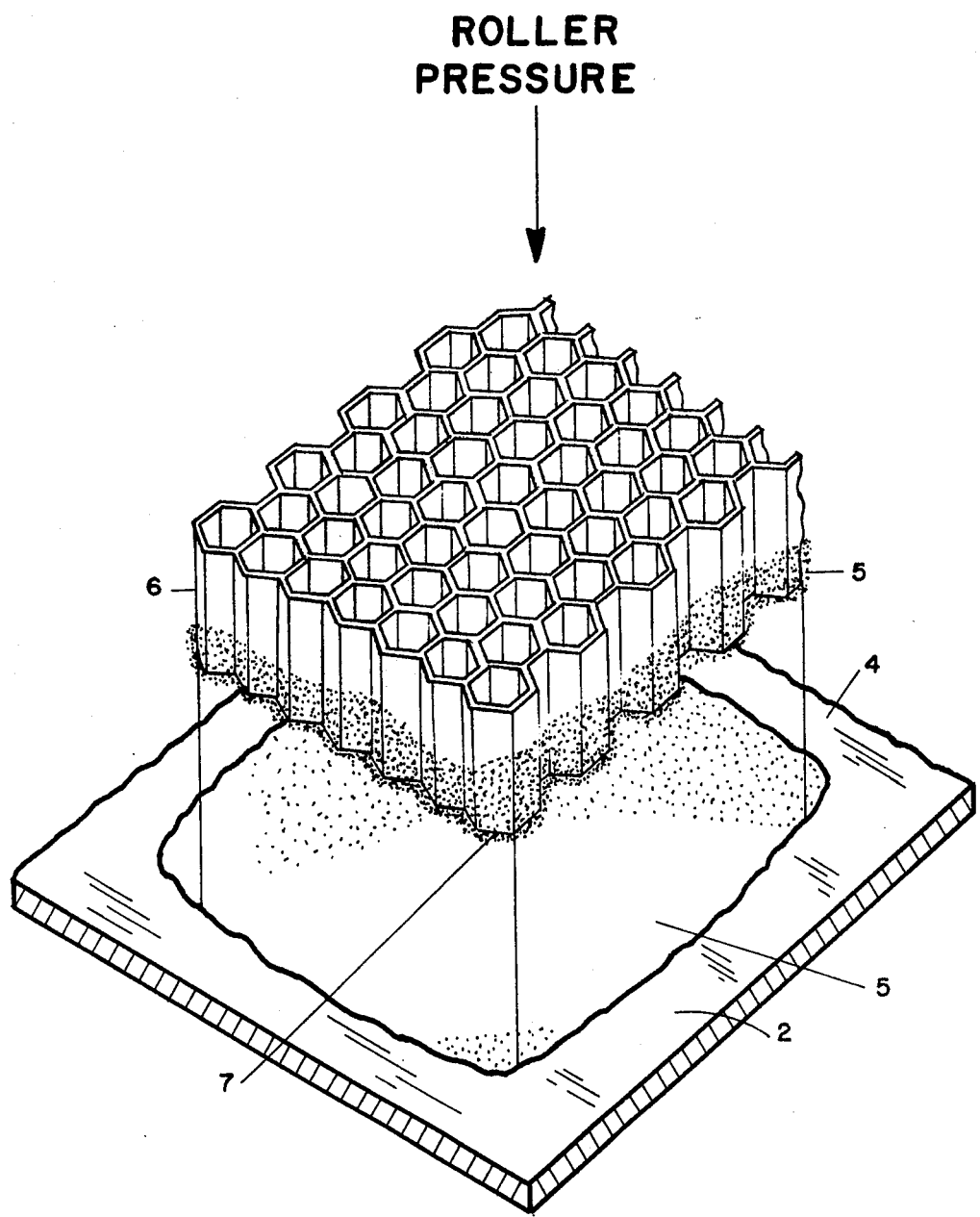

The invention will be further described as to an illustrative embodiment thereof, in conjunction with the attached drawing in which:

FIG. 1 is a schematic depiction of the process and apparatus of the invention; and, FIG. 2 is a perspective view of the apparatus in use on a honeycomb structure.

PREFERRED MODES

Honey is an aqueous solution of fruit sugars and is characterized by having a fructose to glucose ratio of about 1:1, or more broadly between 0.2:1 and 1:0.2. There is wide variation in this ratio within the range because of different bees, different flowers, and different climatic conditions around the world under which natural honey is produced. Artificial honey is known and is meant to be included herein, although natural honey is optimum from both a performance and availability standpoint. Accordingly, the term "honey" herein refers to materials having the foregoing fructose-glucose ratio and which are water based, and preferably such honey materials which in addition consist essentially of (by weight):

| Water | 8-25% |
| Glucose | 30-42% |
| Fructose | 23-39% |
| Sucrose | 0-4% |

The preferred embodiments of the present invention use a chucking material consisting essentially of honey. It is characteristic of honey, unlike the ice and glycol chucking expedient heretofore used, that it improves in chucking ability with heat. Heat is encountered during shaping operations; thus, the honey improves during use as a chucking material. The change in honey with heat is a loss of water, by evaporation from the honey. This loss results in an increase in viscosity, as set forth below. The higher viscosity honey works well as a chucking material. The honey may be preconditioned to the desired viscosity before machining operations begin, again as set forth below. The specific viscosities are not critical and will vary with the machining job at hand, the specific honeycomb workpiece to be treated production throughput desired, and other factors known to those skilled in the art. The honey should not be so dehydrated nor heated that it crystallizes or chars, since such states are not sufficiently strong for the honey to function as a chucking material. It is accordingly preferred that the honey used in the invention processes, apparatus and method be substantially free of crystalline portions which reduce its chucking functionality, and particularly free of crystallinity in excess of 20% by weight, more or less, depending on the specific honey composition and the application at hand.

In FIG. 1, an overview of the process is set out. The honeycomb structure and the support plate are subjected to application of honey by interposition between them, the assembly is conditioned to drive off water as desired by the application of heat and/or vacuum, the shaping operations are carried out, the honey is washed from the honeycomb with water and/or steam and the finished part recovered.

As will be evident from the above, it has been discovered in accordance with the invention, that honey, particularly common clover honey commercially available in a viscosity of 80 to 100 poises at room temperature. i.e. about 76°–78° F., as measured on a Brookfield viscosimeter, when boiled for a few minutes until the viscosity is increased to about 260+ or +30 poises at a temperature of 76°-78° F., provides an effective adhesive for chucking of honeycomb structures or cores. Such viscosity may be increased with heat alone or with heat and vacuum.

After the room temperature viscosity of the honey has been increased, a thin coating of the honey is applied, in carrying out the process of the instant invention, to a flat metal plate. A three mil aluminum foil spread on a moist cleaned flat surface with the dull foil side up has been found satisfactory for use as the metal plate. Thicker, reusable plates might also be used.

After a thin coating of the honey is applied to the flat metal plate surface, the honeycomb structure or core to be mounted on the plate is dipped, reticulate face opposite the face to be machined or shaped downward, into a tray containing honey to a depth of about 3/32 inches upward along the edge margin of the honeycomb face. The honeycomb is dipped, of course, so that its surface to be mounted on and in contact with the honey coated plate is immersed in the honey to a suitable depth, e.g. 3/32 inches. The honey dipped honeycomb surface is then brought into contact with the honey coated surface of the flat aluminum foil plate and the honeycomb and plate are pressed together to form good adherence between the honeycomb and plate. The honeycomb and plate assembly is then desirably inverted and the free side of the foil or plate rolled with a light durometer rubber roller. Such rolling increases contact between the honey coating on the plate and the honey on the dipped honeycomb reticulate face edge margin. The honeycomb core and plate assembly is then conditioned or cured under pressure at about 250° F. until the honey is tacky to the touch, is not crystallized and has not changed color. Depending upon the initial viscosity of the honey coating as originally applied to the plate and the ambient humidity, curing at 250° F. for a time not substantially less than 40 minutes and not substantially more than 70 minutes has been found to be satisfactory. The term "cure" herein and its cognitives refer to the process of water evaporation explained above, and the resultant change in honey viscosity. The term "cure" is not intended to suggest cross-linking of the honey, nor prevalent crystallization thereof.

After bonding and curing, the honeycomb and plate assembly is mounted on a vacuum table and vacuum is applied to the table, in conventional manner, to hold the assembly in place. The exposed surface of the honeycomb core is then relatively fixed suitably for being machined or routed such as with a Quckenbush router head.

After the honeycomb surface has been machined or routed, vacuum on the table is released and the machined or routed honeycomb and plate are removed from the table. In the practice of the instant invention, the attached foil or plate and the honey is removed from the machined honeycomb.

To separate the honeycomb from the foil or plate, the honeycomb and plate assembly is immersed in a tank of water heated to a temperature of about 180° F. In about one minute, the honeycomb and plate are separated. By circulating the water in the tank, in about 30 minutes the honey residue on the honeycomb is removed.

Separation of the honeycomb from the plate and the removal of the honey residue from the honeycomb may be effected more rapidly by increasing the water temperature or by using steam. Conversely, the time before separation and removal will be increased, if the water temperature is lowered. Water at a temperature of 124° F. has been found satisfactory, but somewhat slow in removing the honey residue. Water at room temperature and below is unsatisfactorily slow.

The instant invention will be more fully described and better understood from the following description taken with the appended drawing wherein the honeycomb and plate to be assembled or chucked in accordance with the process of the invention are shown.

Referring to the drawing, plate 2, which may be of metal or a flat metal foil, is coated on one surface, at 4, with honey mass 5, in accordance with the instant invention. Pre-formed honeycomb structure or core 6, suitably formed from thin metal foil, glued in a prearranged pattern and expanded, or from treated paper, plastic or similar material, glued and expanded, is dipped edgewise into honey and applied to the honey mass 5 coated surface 4 on plate 2. The edge margin 7 of core 6 is then pressed into the honey mass 5. The edge of core 6 can be applied to coated surface 4 and pressed into the coated surface without first being separately dipped in honey. Thin metal foil, such as aluminum foil, has been found to be particularly suitable as honeycomb material for use in the instant invention.

The honey, as has been noted above, is applied to the surface of plate 2 and to the edge margin 7 of honeycomb core 6, where core edge dipping is employed, at a Brookfield viscometer poise of 260+ or −30, measured at 76°-78° F. The relatively more viscous commercial grades of honey, such as clover honey from the Sioux City, Iowa region, can be heated with or without vacuum, to obtain the desired 260+ or −30 poise viscosity.

With the edge of core 6 applied to honey coating 4 on the surface of plate 2, pressure is applied to the upper or exposed edge of core 6, pressing the lower or contacting edge into the honey coating and, with such pressure applied, the honey coating between the contacting core edge and plate 2 is heated at 250° F. until the honey is tacky to the touch, has not crystallized and has not changed color. Depending upon the initial viscosity of the honey coating as originally applied to the plate and the humidity of the atmosphere, curing at 250° F. for a time not substantially less than 40 minutes and not substantially more than 70 minutes has been found satisfactory. The assembly, with the cured honey coated surface 4 holding honeycomb core 6 on the surface of plate 2 is removed from the press and cooled to room temperature.

The cooled honeycomb and plate assembly is placed on a vacuum table, vacuum is applied to the table and the assembly is held by the vacuum in fixed position on the table. The upper or exposed surface of honeycomb 6 core can then be machined or routed.

In the practice of the instant invention, with the assembly held on the vacuum table, the exposed honeycomb core surface has been cut down with a Quackenbush router head in steps of one-half inch. Cores so supported and vacuum held have been machined down to a thickness of one-sixteenth of an inch.

After machining or routing has been completed, the assembly is removed from the vacuum table, the assembly is immersed in water heated to 180° F. or heated with steam and the honeycomb core and plate are separated. The core is then rinsed or washed with water at a temperature of 124° F. or higher or with steam until the honey residue is removed.

With the residue removed, the honeycomb is laminated between plates or sheets, in conventional manner, to make up a sandwich. Depending upon the sandwich configuration, such honeycomb sandwich might then be incorporated into a structure.

Honeycomb sandwiches in which the honeycomb has been chucked and the ends finished in accordance with the instant invention have been made up into leading edges of aircraft stabilizers in which the sandwiched honeycomb was approximately 2 feet by 8 feet and have been found to be acceptable.

While it is preferred, in the practice of the instant invention, to process the clover honey to a viscosity of 260+ or −30 poise and to heat the core and honey after the honey coated core edge and plate are pressed together, the honey can be heated at 250° F. to a condition where the honey is just commencing to become tacky, the hot honey can then be applied to the core edge and the coated edge and plate then pressed together. Heating is continued, after the edge and plate are pressed together, until the honey is tacky to the touch.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A process for affixing a honeycomb structure to a plate in a manner whereby said structure and said plate may be chucked and the exposed surface of said honeycomb may be machined, said process comprising the steps of
applying to the surface of said plate a viscous coating of honey;
embedding one surface of said honeycomb in said viscous honey coating to leave the opposite honeycomb surface exposed for machining; and
heating said honeycomb, said plate and said honey coating to cure said coating to more tightly secure said honeycomb to said surface.

2. A process as claimed in claim 1, further comprising the step of coating said one surface of said honeycomb to be embedded in the honey coating on said plate with honey before embedding in said honey coating on said plate.

3. A process as claimed in claim 1, wherein said honey has a viscosity of 260+ or −30 poise measured on a Brookfield Viscometer at 76°-78° F.

4. A process as claimed in claim 1, further including the steps of heating said honeycomb, said plate and said honey coating with an aqueous medium after said exposed honeycomb surface has been machined to solubilize and soften said honey, removing said honeycomb from said plate and rinsing and removing said solubilized and softened honey from said honeycomb after said honeycomb is removed from said plate.

5. A process as claimed in claim 1, further comprising the step of heating said honey to a temperature of about 250° F. and applying said honey at such temperature just before said heated honey is tacky.

6. A process as claimed in claim 5, further comprising the step of applying pressure to said honeycomb.

7. A process as claimed in claim 5, further comprising the step of removing said honey after machining of said honeycomb.

8. A process as claimed in claim 7, further including exposing the honey in honeycomb structure contact to less than atmospheric pressure for a time and at an increased temperature for a period of time sufficient to effect removal of its water portion by evaporation from said honey.

9. A process as claimed in claim 8, wherein said honey is clover honey.

10. A process as claimed in claim 8, wherein the atmosphere pressure is reduced to below 0.8 atmosphere in a controlled environment and the temperature within said environment is maintained above about 150° F.

11. A process as claimed in claim, 8 in which said honey initially has a water content between about 8% and 25%, and said water content is reduced by removal of a portion thereof equal to not less than one-fourth of said initial water content and free of substantial crystallization of said honey.

12. A process as claimed in claim 8, wherein said honey has a fructose to glucose ratio by weight between about 0.2:1 and 1:0.2.

13. A process as claimed in claim 12, wherein said honey has a composition consisting essentially by weight of:

| Water | 8 to 25% |
| Glucose | 30 to 42% |
| Fructose | 23 to 39% |
| Sucrose | 0 to 4% |

14. A process as claimed in claim 13, wherein said honey consists of natural honey.

15. A process as claimed in claim 8, wherein said honey has a Brookfield viscosity above about 260 poise at room temperature.

* * * * *

UNITED STATES PATENT AND TRADEMARK OFFICE
CERTIFICATE OF CORRECTION

PATENT NO. : 4,478,662
DATED : October 23, 1984
INVENTOR(S) : Demitrious Canellos It is certified that error appears in the above-identified patent and that said Letters Patent are hereby corrected as shown below:

Title page, after line [76] insert the following line:

[73] Assignee: Grumman Aerospace Corporation
Bethpage, New York

*Signed and Sealed this*

*Twenty-fifth* Day of *June 1985*

[SEAL]

*Attest:*

DONALD J. QUIGG

*Attesting Officer*    *Acting Commissioner of Patents and Trademarks*